F. W. BROOKS.
Baggage-Seals.
No. 151,749.                           Patented June 9, 1874.
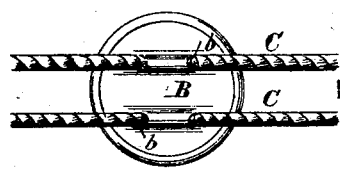 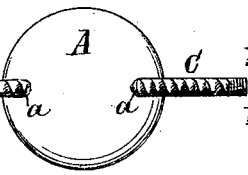 
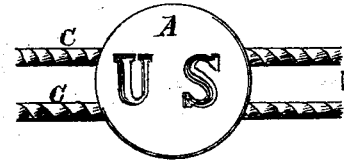 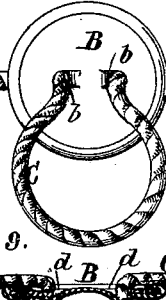 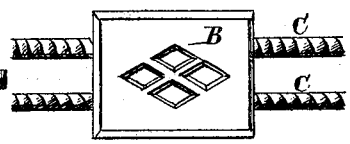
 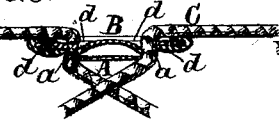 
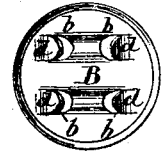 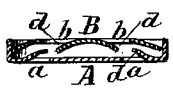 
 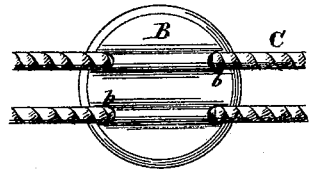
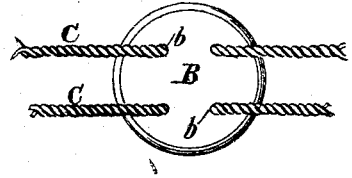 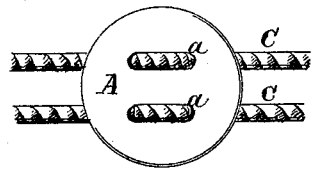
WITNESSES                              INVENTOR
                                       Franklin W. Brooks.
                                       By Knight &c. Attorneys

UNITED STATES PATENT OFFICE.

FRANKLIN W. BROOKS, OF NEW YORK, N. Y., ASSIGNOR TO EDWARD J. BROOKS, OF SAME PLACE.

IMPROVEMENT IN BAGGAGE-SEALS.

Specification forming part of Letters Patent No. 151,749, dated June 9, 1874; application filed April 9, 1874.

*To all whom it may concern:*

Be it known that I, FRANKLIN W. BROOKS, of the city of New York, N. Y., have invented a new and useful Improvement in Baggage-Seals, of which the following is a specification:

My device consists of a seal of sheet metal with perforations through which the ends of a cord or wire are passed, and lips arranged to secure and retain the said ends when the parts are pressed together, as hereinafter described.

In the accompanying drawings, Figure 1 is a rear view of a seal illustrating my invention, with the two ends of a cord applied. Fig. 2 is a front view of the same. Fig. 3 is a section thereof at 3 3. Fig. 4 is a rear view of the front plate detached. Fig. 5 is a section of the two plates without the cord. Fig. 6 is a rear view of the complete seal, illustrating its application to wire. Fig. 7 is a front view of the seal with a modified construction—that is to say, with the perforations passing completely through. Fig. 8 is a rear view of the same. Fig. 9 is a section thereof on the line 9 9, Figs. 7 and 8. Fig. 10 is a section of the plates adapted to form the seal shown in Figs. 7, 8, and 9. Figs. 11 and 12 are, respectively, a rear view and a front view of a seal with four through apertures, and showing the ends of the cord as before. Fig. 13 is a rear view of a seal in square form, also illustrating my invention. Fig. 14 is a front view of the same. Fig. 15 is a section thereof on the line 15 15, Figs. 13 and 14. Fig. 16 is a sectional view of a single plate of metal, from which the seal shown in Figs. 13, 14, and 15 may be formed.

My sealing device consists essentially of a front and rear leaf, A B, made of sheet metal, in either one or more pieces. One or both of these leaves are made with one or more perforations, $a\ b$, through which the end of the cord or wire C to be secured is passed, either directly from back to front, as illustrated in Figs. 7, 8, 9, 11, and 12, or in and out at the same side, as in Figs. 1, 2, and 3, and 13, 14, and 15. Adjacent to the holes $a$ or $b$ are lips $d$, on either or both of the plates, arranged to gripe the cord or wire C, and hold it immovably, when the plates are pressed together. The front plate A may, if preferred, be made of thinner metal than the back B, the holding-lips being in this case formed on the back, and requiring to have some degree of stiffness and strength to adapt them to perform their duty in holding the cord or wire. The front of the seal may be ornamented in any manner desired. In securing the leaves together, whether they be made in one or two pieces of metal, I employ machinery such as is commonly used in the manufacture of metallic buttons, the edge of the front being neatly turned over the back, and a bead being formed, if desired, according to taste.

In applying the invention, the package to be secured is tightly corded in customary manner, and the ends of the cord (or wire) are then passed through the apertures in either manner illustrated, or in any other way that will produce the same effect. The seal is then compressed with a suitable tool which will at the same time produce a distinguishing mark on the face of the seal.

My device is greatly superior to the soft-metal seals now commonly employed for securing cords or wires for various purposes, because such soft-metal seals, with skill and care, may be removed and replaced without destroying their private marks; or impressions of such private marks may be taken and transferred to new seals applied in place of those removed in such a manner as to defy detection.

The merit of my invention consists, therefore, in devising a construction of sheet-metal seal which, when compressed with a hammer, or with a tool such as is now used in applying lead seals, will securely hold the ends of the wire or cord, and cannot be removed without severing some part of the fastening.

The private marks, numbers, or other distinguishing devices may, of course, be made on the seals in their manufacture, in which case a blow with a hammer will suffice to secure them when applied.

I claim as new, and desire to secure by Letters Patent—

The seal A B, constructed with one or more apertures, $a$ or $b$, and holding-lips $d$, substantially as and for the purposes herein set forth.

In testimony that I claim the above as my invention I hereunto set my hand this 9th day of April, 1874.

FRANKLIN W. BROOKS.

Witnesses:
OCTAVIUS KNIGHT,
WALTER ALLEN.